July 4, 1944.  W. E. WALKER  2,352,925

TAPE PERFORATING SYSTEM

Filed April 10, 1943  2 Sheets-Sheet 1

INVENTOR
WILLIAM EDWARD WALKER
BY
ATTORNEY

July 4, 1944.  W. E. WALKER  2,352,925
TAPE PERFORATING SYSTEM
Filed April 10, 1943  2 Sheets-Sheet 2

INVENTOR
WILLIAM EDWARD WALKER
BY H. S. Grover
ATTORNEY

Patented July 4, 1944

2,352,925

UNITED STATES PATENT OFFICE 2,352,925

TAPE PERFORATING SYSTEM

William Edward Walker, San Francisco, Calif., assignor to Radio Corporation of America, a corporation of Delaware Application April 10, 1943, Serial No. 482,553

5 Claims. (Cl. 164—113)

This invention relates to a new and useful system for uniformly perforating paper tape used in telegraph signal recording or reproducing.

An object of this invention is to simplify and improve the mechanism for perforating paper tape with guide or feed holes simultaneously with the incoming signal.

Another object of this invention is to provide a uniformly spaced guide or feed hole punch for telegraph tape which will accurately follow the impulses of a telegraph signal.

A feature of this invention is the novel circuit arrangement of two different electrical contact groups both of which are simultaneously actuated by a linkage mechanism coupled to a utilization device, the arrangement being such that the tape is simultaneously perforated with feed holes, commonly called center holes, which are punched in step with the signal pulse elements.

This invention is a further improvement over the U. S. patent application of R. E. Mathes, Serial No. 393,778, filed May 16, 1941, wherein a system is disclosed for use with a Creed reperforator head, whereas this particular invention is adapted for use in conjunction with an improved telegraph system using the Higgitt apparatus, although my invention is not specifically limited thereto. In the above Mathes application the tape is perforated with guide or feed holes by the action of a ratchet member which is indirectly actuated by a solenoid. In the present invention the tape is perforated or punched with guide holes directly by means of the solenoid.

Several well known telegraph printing systems such as the Creed, Higgitt, etc., operate by having the received telegraph impulses perforate a narrow band of paper tape corresponding to the marking and spacing elements making up the various letters of figure elements of the code used. This paper tape must pass through the signal perforating mechanism by means of a continuous series of accurately spaced center holes or feed holes cut into said tape and moved along by a mechanism employing a sprocket wheel or tape feed wheel.

The required accuracy of these center holes or tape feed holes must be kept within very close tolerances if the marking and spacing of the incoming signal elements are to be recorded in the correct relative position for proper reproduction. In the prior art systems the tape used generally is accurately pre-perforated by a precision machine, then re-wound on large rolls and stored for future use. My invention enables these center holes or feed holes to be punched in the tape in synchronism with the marking and spacing signal elements in such a way that they are punched from plain unperforated tape as the tape is needed. This eliminates the need before reception for pre-perforating, or re-winding of the same and also guarantees absolute accuracy between the center holes, as it has been found, particularly during storage, that the spacing of the center holes will sometimes vary due to varied atmospheric conditions causing expansion and contraction of the preperforated tape.

This invention will best be understood by referring to the accompanying drawings in which.

Figure 1:
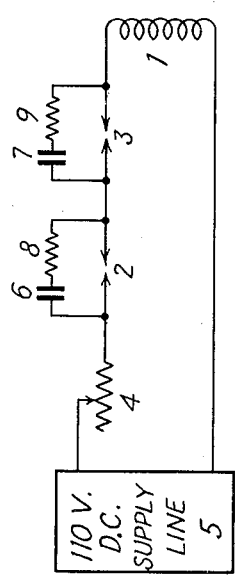
Fig. 1 is a circuit diagram of the tape feed mechanism of my invention.

Referring now in detail to the circuit diagram shown in Fig. 1, an electromagnetic solenoid 1 is electrically connected in series with two pairs of electrical contacts 2 and 3, a suitable resistor 4 and a source of power 5, which is preferably that of a 110 volts D. C. To eliminate sparking of the contacts, the pair of contacts 2 are shunted with a condenser 6 and a resistor 8. The pair of contacts 3 are similarly shunted with a condenser 7 and a resistor 9, both the condensers and the resistors being of suitable values to suppress sparking.

Figure 3:
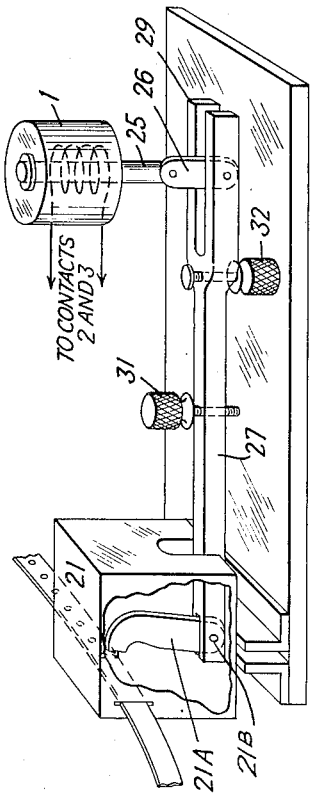
Fig. 3 is a side view in perspective showing the principal portion of the punching mechanism.
Figure 2:
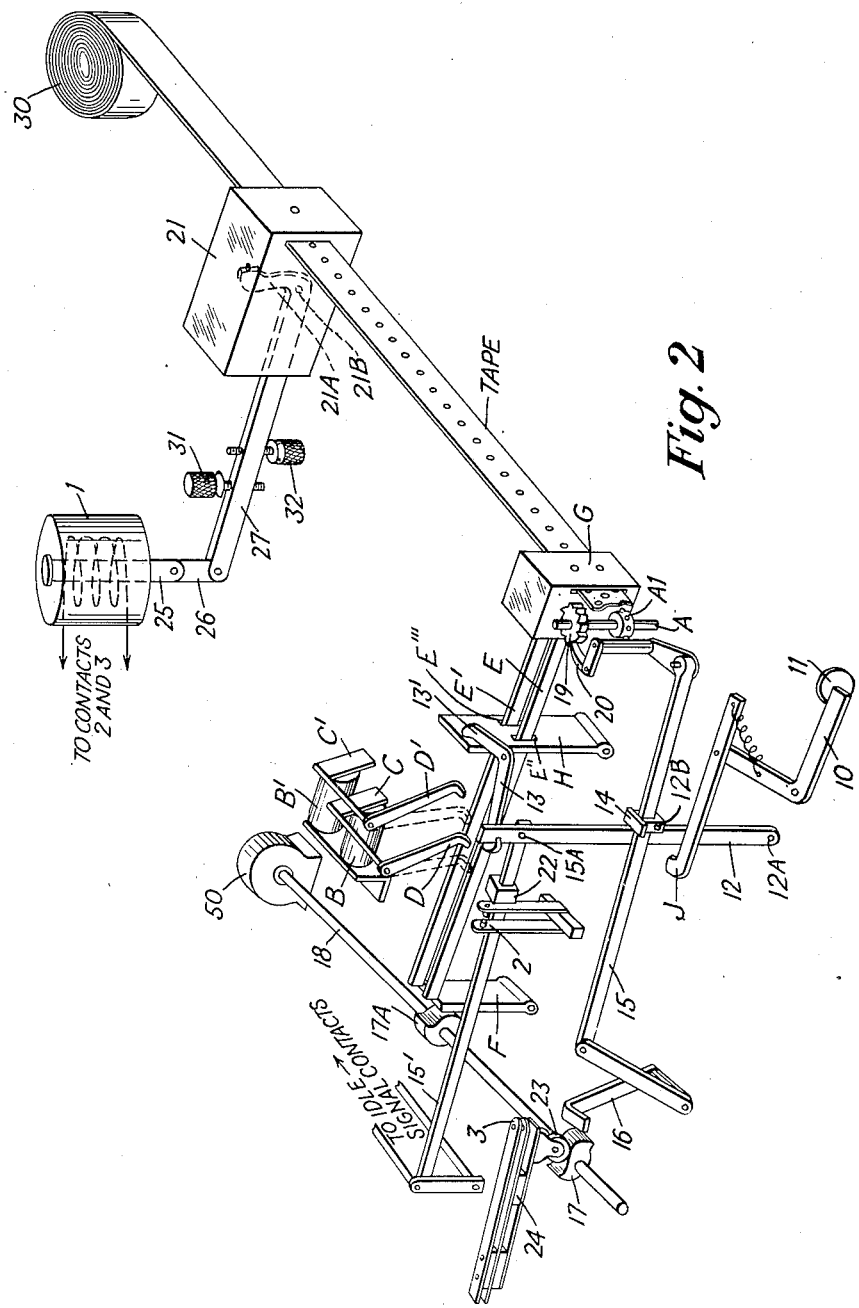
Fig. 2 is a perspective view of the linkage members and associated mechanism.

A tape perforating arrangement which is shown by Figs. 2 and 3 is particularly adapted for use with the Higgitt system as described in U. S. Patent 2,029,071, patented January 28, 1936, and includes the solenoid actuated device which is shown at the upper right hand side of Figure 2 and together with the pair of contacts 2 and 3 form the principal feature of this invention. The remaining portion shows the principal mechanical elements of a Higgitt reperforator with the unessential details omitted to simplify this description. A pivoted latch lever 10, which is shown at the lower left hand side of the drawings, is arranged to be actuated by suitable means such as, for example, an actuating button 11. A pivoted arm 12 is pivoted at 12A and arranged to assume a vertical position as indicated. The position of arm 12 is governed by a latch member J.

At the upper portion of arm 12 another latch 13 is provided to normally hold arm 12 in its vertical position. A stop member 14 contacts the central portion of arm 12 and is secured to a horizontal arm 15. A cam lever 16 is by means of a set screw 12B pivoted to the left hand end of the horizontal arm 15 and is arranged to contact a two point cam 17 which is mounted upon a shaft 18. A second cam 17A is also secured to shaft 18. To the right of arm 15 there is linked a ratchet 19 and pawl arrangement 20. The ratchet 19 is secured to a vertical shaft A which also contains a feed wheel A1 with teeth arranged on its outer periphery for engaging the central guide holes of the tape. Adjacent the ratchet and pawl arrangement there is located a punch block device G having suitable slotted apertures to permit the passage of the tape therethrough. To the rear of the punch block G there are linked two signal knives E and E' which are positioned to rest upon a pivoted member F which is so pivoted at the lower portion thereof as to be actuated by the cam 17A. The knives E and E' are also positioned within apertures E'' and E''' in a pivoted member H. The upper portion of member H engages with a latch arm 13', the arrangement being such as to cause latch 13 to move away from the arm 12 during operation of the signal, which will be described more in detail later. Positioned directly above the signal knives E and E' of the Higgitt system mentioned above are two electromagnets B and B' having pivoted armatures C and C' which are linked to extension arms D and D'. The positions of arms D and D' are such that when the magnets B and B' are energized, the arms D and D' will move to a downward position as indicated by the dash lines and will actuate the knives E and E' to punch the holes in the tape each side of the central guide holes in response to the incoming signals. A second horizontal arm 15' is linked by a pin 15A to arm 12 and has arranged thereon an insulating stop 22 which is positioned on arm 15' to actuate the closing of contacts 2. The extreme left hand end of arm 15' is joined to a suitable linkage system which is coupled to a group of idle signal contacts not shown. The pair of contacts 3 are actuated by means of a roller 23 which rides on cam 17. An insulating block 24 is provided to actuate the contacts and insulate the electrical circuit from the mechanical structure. A reperforator motor 50 is provided for rotating shaft 18.

The improved features of my present invention consist, in addition to the arrangement of contacts 2 and 3 with the reperforator mechanism mentioned above, of a punch assembly device which includes a punch block 21 having a slotted aperture therein for passing the tape, and also means for punching a single center guide hole in the tape. The roll of tape 30 is located adjacent the punch block 21 and is secured in position by any suitable means to permit the unrolling thereof. Located within punch block 21 there is pivoted a punch arm 21A which carries a center hole punch. The arm 21A is pivoted at 21B and has an extension portion 27 which is coupled to a link 26 and is pivoted to an armature 25 which passes through the solenoid 1 which is of the open core type. The winding of solenoid 1 is electrically connected to both pairs of contacts 2 and 3, as shown in the circuit diagram of Fig. 1. The limit of motion of arm 27 is controlled by means of adjustable stops 31 and 32.

Figure 4:
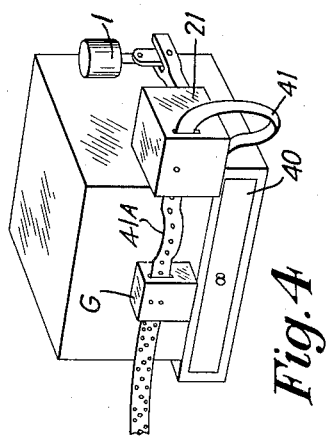
Fig. 4 is a perspective view of the completed assembly of the mechanism mounted on the side of an existing reperforator.

The assembly shown by Fig. 4 includes a housing for the complete mechanism. The feedhole punch block 21 is shown mounted at the right of the housing. The roll of unperforated tape 30 is stored within the drawer or compartment 40 located in the base of the housing. The front of the housing contains the punch block G which was shown schematically in Fig. 2. Due to the fact that the tape advance at 21 and G are not exactly in equal step in normal action, the tape is carried from 21 to G by the way of a short loop 41A. An idler pulley (not shown) may be employed to retain the large loop 41 in position.

In the operation of this improved system of my invention, the latch lever 10, on being pressed by the actuating button 11, causes the pivot arm 12 to assume a vertical position as shown and the device is ready for operation. This vertical position continues to exist when no traffic signals are being received. In this position, the latch 13 holds the vertical arm 12 in the position indicated. An idle signal is prevented from reaching the signal magnets B by the action of the idle signal contacts not shown. When signals other than the idle are received, one or the other of the two signal magnets B or B' will be energized in response to the incoming signal elements. When magnets B and B' are energized their armatures C and C' are actuated and cause the extension arms D to move downwards in the position indicated by the dash lines, and immediately act upon the signal knives E and E'. The member F is actuated by a cam 17A which engages with the signal knives E and E' when they are depressed by the armature extension arms D and are thus arranged so that knives E and E' will move forward and force their associated punches not shown which are located within the punch block G to pass the tape. The signal knives E in their forward motion carry with them the pivoted member H and this member engages with the latch arm 13' causing latch 13 to move away from arm 12 which is released and falls to the left. The stop 14 prevents the horizontal arm 15 from moving to the left as a cam lever 16 rides off the high point of the two point cam 17. The movement of cam 17 through the lever 16 and arm 15 causes the tape to be advanced one center hole for each ½ revolution of shaft 18, or in other words, one centerhole for each cam action through the ratchet 19 and pawl arrangement 20. Cam 17 through lever 16 arm 15 pawl 20 and ratchet 19 causes the feedwheel A to rotate and advance the tape through the punch block G. Circumferential displacement of cams 17 and 17A causes the perforation of the tape in punch block G and also the advance of the tape by feedwheel A to be alternate. When the signal reception is complete feedwheel A will continue to advance the tape until lever 10 is pressed to the left. When the lever 10 is pressed to the left latch J pulls arm 12 forward and latch 13 holds it as indicated in Fig. 2, thus causing feedwheel A to cease rotating.

If contacts 2 are shorted out of the circuit, solenoid 1 will be energized by contacts 3 twice during each revolution of cam 17. Punch block 21 with its associated punch members causes perforation of the center feedholes and also the advance of the tape through the punch block, and is actuated by the pivoted member 21A linked to the extension arm 27. Thus in operation one center hole is punched for each closure of contacts 3 if contacts 2 are already closed and the punch block 21 will then prepare the tape with center holes at exactly the same rate as the tape is fed forward by feedwheel A through the reperforator punch block G. In the position indicated in Fig. 2 the arm 12, upon engaging with stop 14, prevents ratchet 19 from falling back sufficiently to engage the next pawl and thus the tape ceases to be fed through the reperforator punch block G.

As shown in the circuit diagram of Fig. 1, the spring contacts 2, which are connected in series with contacts 3 and solenoid 1, remain open and thus the solenoid will not be energized. This condition continues while no incoming signals are being received and therefore the tape is not driven through the reperforator punch block G. On the reception of an incoming signal the assembly H of the reperforator signal knives E engages with extension arm 13' on latch 12 moving the extension arm 13' to the right and releasing the vertical arm 12 which with its arm 15' then moves to the left. Stop 22 now causes contacts 2 to close. This condition remains until with the cessation of any incoming signals the latch arm 10 is pressed to the left when the assembly again resumes the inactive position indicated in Fig. 2. When contacts 2 are closed, a roller 23, riding on cam 17, through the insulating block 24 acts on spring contacts 3 causing them to alternately open and close, that is, one closure for each cam action, thus causing solenoid 1 to be energized. On each closure of contacts 3 the solenoid 1, acting through link 26 and pivoted arm 27, causes punch block 21 and the feed tape arrangement to punch one center hole and to advance the tape the space of one center hole in preparation for the next punch action. Thus exact synchronism is maintained between the speed at which center holes are punched and the speed at which the reperforator feeds them forward.

It will thus be seen that with the improved features of this invention there is provided a method of punching center holes in the reperforator tape only as and when needed. In other words, the arrangement is such that the contacts open the circuit to solenoid 1 when feedwheel A is at rest and close the circuit when feedwheel A is rotated. The roll of unperforated tape 30, as shown by Fig. 4, passes out at the right over a roller and to the left through assembly 21 where it is prepared with center holes for feeding the tape. The punched tape then passes through the Higgitt reperforator punch block G where it is perforated in response to the incoming signal by means of knives E and E'.

Spring contacts 3 require a small amount of power from the reperforator motor 50, but it is arranged so that it will receive this power at the moment when there is a low load and returns it to the shaft 18 at the moment of a higher load.

While I have indicated and described a system for carrying my invention into effect, it will be apparent to one skilled in the art that my invention is by no means limited to the particular mechanism shown and described, but that many modifications may be made without departing from the scope of my invention.

What I claim is:

1. Apparatus for perforating feed guide holes in tape concurrently with an incoming telegraph signal comprising a utilization device, a tape punching means, a solenoid linked with said tape punching means, a linkage system associated with said utilization device, contact means actuated by said linkage system, and actuating means whereby said contacts are closed by movement of said linkage system to energize said solenoid and to punch said tape in step with the telegraph signal.

2. Apparatus for perforating feed guide holes in tape concurrently with an incoming telegraph signal comprising a utilization device, a tape punching means, a solenoid linked with said tape punching means, a linkage system associated with said utilization device, contact means, having a pair of contacts, said contacts actuated by said linkage system, and actuating means whereby said contacts are closed by movement of said linkage system to energize said solenoid and to punch said tape in step with the telegraph signal.

3. Apparatus for perforating feed guide holes in tape concurrently with an incoming telegraph signal comprising a utilization device, a tape punching means, a solenoid linked with said tape punching means, a linkage system associated with said utilization device, contact means actuated by said linkage system, a reperforator and actuating means associated with said reperforator whereby said contacts are closed by movement of said linkage system to energize said solenoid and to punch said tape in step with the telegraph signal.

4. Apparatus for perforating feed guide holes in paper tape concurrent with an incoming telegraph signal comprising a utilization device, a tape punching means, a solenoid linked with said tape punching means, a linkage system associated with said utilization device, contact means actuated by said linkage system, and actuating means including a cam whereby said contacts are closed by movement of said linkage system to energize said solenoid and to punch said tape in step with the telegraph signal.

5. Apparatus for perforating feed guide holes in paper tape concurrently with an incoming telegraph signal comprising a utilization device, a tape punching means, a solenoid linked with said tape punching means, a linkage system associated with said utilization device, contact means including a pair of electrical contacts connected in series and actuated by said linkage system, and actuating means including a cam whereby said contacts are closed by movement of said linkage system to energize said solenoid and to punch said tape in step with the telegraph signal.

WILLIAM EDWARD WALKER.